J. GLANZ.
REPAIR OF BICYCLE PEDALS.
APPLICATION FILED NOV. 23, 1918.

1,352,445.

Patented Sept. 14, 1920.

Inventor
Joseph Glanz.
by Arthur B. Jenkins
Attorney

UNITED STATES PATENT OFFICE.

JOSEPH GLANZ, OF HARTFORD, CONNECTICUT.

REPAIR OF BICYCLE-PEDALS.

1,352,445.  Specification of Letters Patent.  Patented Sept. 14, 1920.

Application filed November 23, 1918. Serial No. 263,834.

*To all whom it may concern:*

Be it known that I, JOSEPH GLANZ, a citizen of the United States, and a resident of Hartford, in the county of Hartford, and State of Connecticut, have invented an Improvement in the Repair of Bicycle-Pedals, of which the following is a specification.

My invention relates to the operation of attaching a bicycle pedal to the crank after the parts have become so worn as to render the original attachment inefficient, and an object of my invention, among others, is to provide for the attachment of the pedal to the crank in a strong and efficient manner after the original attaching means have become destroyed.

One form of device embodying my invention and in the contruction and use of which the objects herein set out, as well as others, may be attained, is illustrated in the accompanying drawings, in which—

Figure 1:
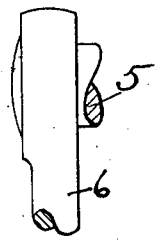
Figure 1 is a view in side elevation of a portion of the crank of a bicycle showing a pedal attached thereto by my improved attachment, parts being broken away in central section to show the construction.
Figure 2:
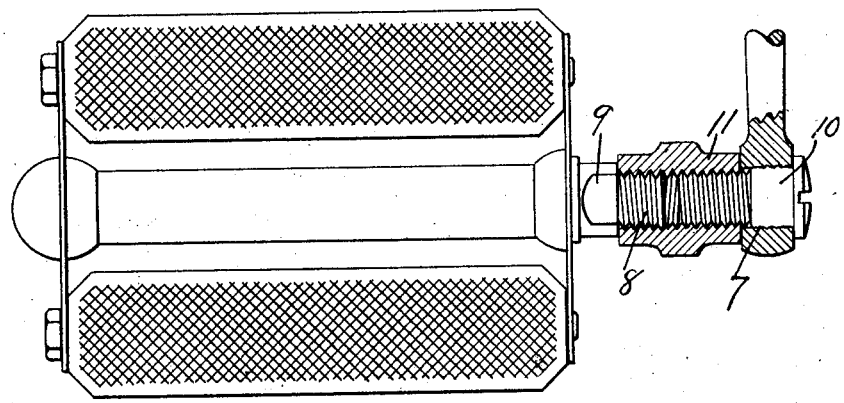
Fig. 2 is a detail side view of the attaching bushing.
Figure 3:
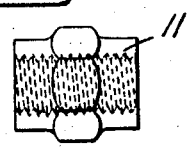
Fig. 3 is a detail side view of the attaching stud.

While my invention is illustrated and described herein with special reference to the attachment of pedals to bicycle cranks, yet it will be understood that it contemplates other constructions in which similar conditions may exist.

It is common practice, at the present time, to attach a bicycle pedal to the crank arm by means of a threaded connection, the pedal shaft being threaded to engage a threaded hole through the end of the crank arm. For various reasons the thread, specially that of the hole in the crank arm, soon becomes worn out, and this is of so frequent occurrence as to have attracted the attention of repairmen to an unusual degree, as when such worn out condition has taken place, prior to my invention, it has necessitated the supplying of an entirely new outfit comprising a crank arm, and pedal with its shaft at one end of the crank shaft, and a new crank shaft and a crank arm at the opposite end of the crank shaft. This involves a considerable expense, and in view of the rapidity with which said parts are worn out, has created a serious condition.

By the use of my improvement I avoid this trouble and expense by providing means whereby the use of the old crank arm and pedal may be continued by simply supplying a few comparatively inexpensive parts. Such improvement is illustrated in the accompanying drawings in which the numeral 5 indicates the crank shaft of a bicycle, and 6 the crank arm thereof, both of any usual and common construction. A hole 7 is formed through the end of the crank arm, this hole, in its original condition, having been threaded to receive the threaded end 8 of the pedal shaft 9. The hole is shown in the drawings herein with the original thread mutilated and much worn.

When this condition as to the worn-out parts occurs, instead of discarding all of the parts as above described, the original pedal by the practice of my invention may be attached to the old crank having the worn out thread as by means of a threaded stud 10 extended through the hole 7 and engaging within a threaded opening through a bushing 11, this threaded opening in the bushing being of a size to fit the threaded end 8 of the original pedal shaft 9 which threaded end seldom becomes worn out. Both ends of the hole in the threaded bushing will have the same thread and consequently, by preference, the thread on the stud 10 will be the same as that on the end 8 of the pedal shaft.

It will thus be seen that the pedal, when the parts have become worn out, as hereinabove described, may be quickly secured in place by the addition of the stud 10 and bushing 11 only, requiring but little time and necessitating but little expense.

My invention contemplates other means than those herein specifically shown and described for securing the bushing in place, and in accordance with the provisions of the patent statutes, I have described the principle of operation of my invention, together with the apparatus which I now consider to represent the best embodiment thereof; but I desire to have it understood that the device shown is only illustrative, and that the invention may be carried out by other means.

I claim—

1. In combination with a bicycle crank arm having an opening, and a pedal structure embodying a pedal shaft having a threaded end extending beyond the pedal structure, a bushing separate from and terminating short of the pedal structure and having a threaded opening to receive the threaded pedal end, and means for securing said bushing to the crank arm.

2. In combination with a bicycle crank arm having an opening, and a pedal structure embodying a pedal shaft having a threaded end extending beyond the pedal structure, a bushing independent of the pedal structure having a threaded hole extending therethrough to fit the threaded extension end of the pedal shaft, and a stud to project through the opening in the crank arm and fit and engage the thread in said bushing to hold it in place.

3. In combination with a bicycle crank arm, a pedal including a member projecting beyond one end thereof, a bushing independent of said pedal and adapted to be detachably secured to said projecting member, and means for securing said bushing to said crank arm.

4. In combination with a bicycle crank arm having an opening therein, a pedal, a threaded bushing independent of the pedal construction threaded to and projecting from one end of said pedal, and a threaded stud of a size substantially to fill said crank arm opening and projecting therethrough and engaging the threaded opening in said bushing.

5. In combination with a bicycle crank arm having an opening therein, a pedal including a member projecting from one end thereof, a bushing independent of the pedal structure and mounted on the member projecting from the pedal and abutting with its other end against the side of said crank arm, and a threaded stud projecting through and substantially filling the opening in said crank arm and fitting a screw thread through said bushing to draw its end against the side of the crank arm.

JOSEPH GLANZ.